(12) United States Patent
Robison

(10) Patent No.: US 6,524,035 B1
(45) Date of Patent: Feb. 25, 2003

(54) CONDUIT REAMER TOOL ASSEMBLY

(75) Inventor: Troy Robison, Ingleside, IL (US)

(73) Assignees: Thomas Vigil, Barrington, IL (US); Gary Sebastian, Lake Zurich, IL (US)

(*) Notice: Subject to any disclaimer, the term of this patent is extended or adjusted under 35 U.S.C. 154(b) by 0 days.

(21) Appl. No.: 09/663,873

(22) Filed: Sep. 15, 2000

Related U.S. Application Data

(63) Continuation-in-part of application No. 09/522,229, filed on Mar. 9, 2000, now Pat. No. 6,193,242, which is a continuation-in-part of application No. 09/317,231, filed on May 24, 1999, now Pat. No. 6,135,462, which is a continuation-in-part of application No. 09/013,996, filed on Jan. 27, 1998, now Pat. No. 5,921,562.

(51) Int. Cl.[7] .............................................. B23B 51/00
(52) U.S. Cl. ....................... 408/211; 81/177.4; 81/490; 408/224; 408/226
(58) Field of Search ................................ 408/211, 224, 408/223, 226, 238, 241 R, 80, 82; 7/157, 158, 165, 901; 81/177.4, 490, 181

(56) References Cited

U.S. PATENT DOCUMENTS

| | | | | |
|---|---|---|---|---|
| 2,761,335 A | * | 9/1956 | Bernardi | 408/224 |
| 2,765,013 A | * | 10/1956 | Pedersen | 81/490 |
| 3,595,107 A | * | 7/1971 | Dackow | 408/211 |
| 4,274,770 A | * | 6/1981 | Singer | 408/211 |
| 4,278,119 A | * | 7/1981 | Elmore | 81/490 |
| 4,572,038 A | * | 2/1986 | Graham | 81/177.4 |
| 4,653,356 A | * | 3/1987 | Golden | 81/490 |
| 4,976,175 A | * | 12/1990 | Hung | 81/490 |
| D333,964 S | | 3/1993 | Alexander | |
| 5,427,477 A | * | 6/1995 | Weiss | 408/224 |
| 5,916,341 A | * | 6/1999 | Lin | 81/490 |
| 6,164,172 A | * | 12/2000 | Huang | 81/490 |

\* cited by examiner

*Primary Examiner*—Daniel W. Howell
(74) *Attorney, Agent, or Firm*—Thomas R. Vigil; Welsh & Katz, Ltd.

(57) ABSTRACT

The conduit reamer assembly comprises: a spindle having a main body portion, a distal end and a proximal end; drive structure on the spindle for mating with corresponding drive structure in a rotatable drive structure in or on which the conduit reamer assembly is mounted; a conduit reamer mounted on the spindle and comprising at least two stepped cylindrical sections including a first cylindrical section and a second larger diameter section; a first plate-like member extending radially outwardly of the first cylindrical section and having a generally hook-shape defining a U-shaped space between the cylindrical section and an outer axially extending finger of the plate-like member; the second cylindrical section having a second plate-like member extending generally radially outwardly from the second cylindrical section and defining a U-shaped space between the second cylindrical section and an outer axially extending finger; and the conduit reamer being fixed against rotation on the spindle and the U-shaped spaces being adapted to be received over a cut end of a piece of conduit for engaging the cut end as the conduit reamer is rotated. The conduit reamer assembly can further include a tool magazine including a body having a throughbore which is received over the spindle and behind the conduit reamer. The body has a rearwardly facing surface and the tool magazine includes at least one bore, socket or hole extending into the tool magazine from the back surface thereof for receiving and storing a tool.

19 Claims, 2 Drawing Sheets

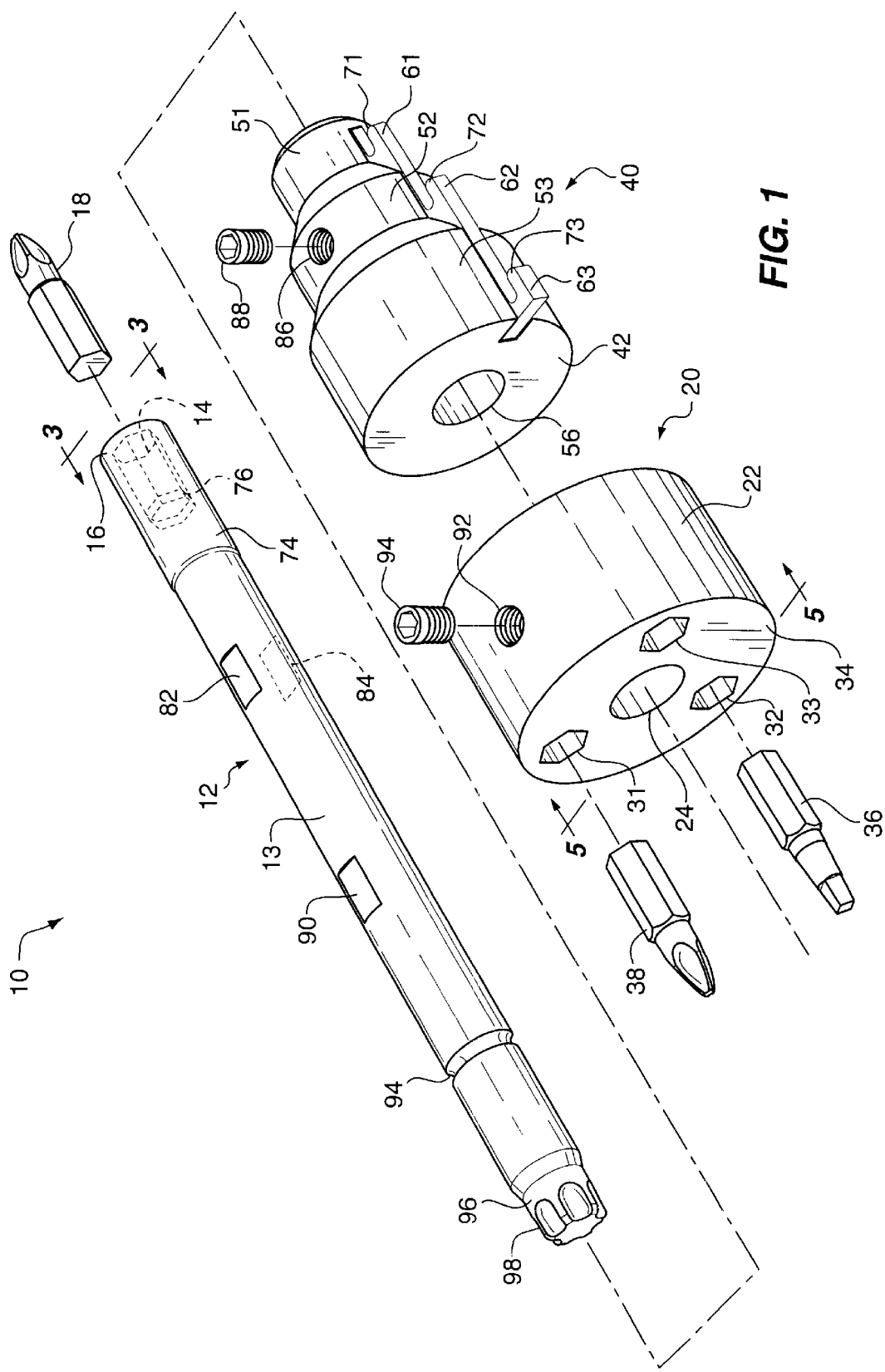

CONDUIT REAMER TOOL ASSEMBLY

CROSS-REFERENCE TO RELATED APPLICATIONS

This application is a Continuation-In-Part of U.S. application Ser. No. 09/522,229 filed on Mar. 9, 2000, now U.S. Pat. No. 6,193,242, which is a Continuation-In-Part of U.S. application Ser. No. 09/317,231 filed on May 24, 1999, now U.S. Pat. No. 6,135,462, issued on Oct. 24, 2000, which is a Continuation-In-Part of U.S. application Ser. No. 09/013,996 filed on Jan. 27, 1998, now U.S. Pat. No. 5,921,562, issued on Jul. 13, 1999.

BACKGROUND OF THE INVENTION

1. Field of the Invention

The present invention relates to a conduit reamer tool assembly adapted to be mounted in a structure for rotating the tool assembly, such as a chuck assembly, and includes a spindle with a socket in an outer end for receiving and releasably holding a tool and a conduit reamer mounted on the shaft of the spindle. The spindle has structure at an inner end for engaging and being driven by mating driving structure in the structure for rotating the chuck assembly and a tool magazine for holding tools can be mounted on the spindle.

2. Description of the Prior Art

Heretofore various tool assemblies have been proposed for mounting to a conventional chuck assembly, to a specially configured chuck assembly or to other structure for rotating the tool assembly.

Also, it has been proposed to provide a conduit reamer mounted on a screw driver for use in reaming the outer ends of conduits, e.g. ½", ¾" or 1' conduits after cutting the conduit with a hacksaw.

Examples of previously proposed tool assemblies and tool holders are disclosed in the following U.S. patents:

| U.S. Patent No. | Patentee |
| --- | --- |
| U.S. Pat. No. 5,921,562 | Robison |
| U.S. Pat. No. 6,193,241 | Robison |

A conduit reamer mounted on a screw driver is disclosed in U.S. Pat. No. Des. 333,964 issued Mar. 16, 1993.

SUMMARY OF THE INVENTION

According to the present invention there is provided a conduit reamer assembly comprising: a spindle having a main body portion, a distal end and a proximal end; drive structure on the spindle for mating with corresponding drive structure in a rotatable drive structure in or on which the conduit reamer assembly is mounted; a conduit reamer mounted on the spindle and comprising at least two stepped cylindrical sections including a first cylindrical section and a second larger diameter section; a first plate-like member extending radially outwardly of the first cylindrical section and having a generally hook-shape defining a U-shaped space between the cylindrical section and an outer axially finger of the plate-like member; the second cylindrical section having a second plate-like member extending generally radially outwardly from the second cylindrical section and defining a U-shaped space between the second cylindrical section and an outer axially extending finger; and the conduit reamer being fixed against rotation on the spindle and the U-shaped spaces being adapted to be received over a cut end of a piece of conduit for engaging the cut end as the conduit reamer is rotated. The conduit reamer assembly can further include tool magazine including a body having a throughbore which is received over the spindle and behind the conduit reamer. The body has a rearwardly facing surface and the tool magazine includes at least one bore, socket or hole extending into the tool magazine from the back surface thereof for receiving and storing a tool.

BRIEF DESCRIPTION OF THE DRAWINGS

FIG. 1 is an exploded perspective view of the tool assembly of the present invention.

DESCRIPTION OF THE PREFERRED EMBODIMENT(S)

Figure 5:
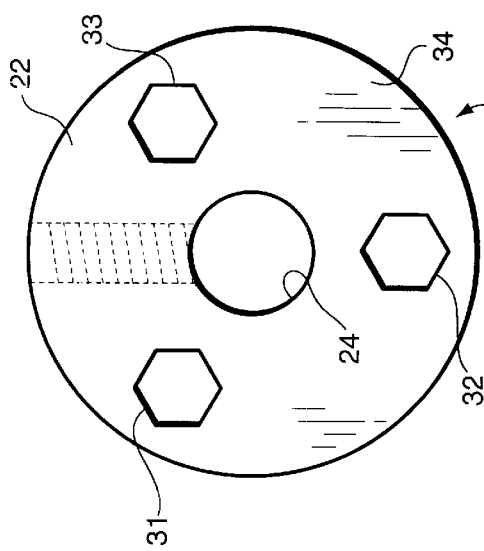
FIG. 5 is an inner end view of a tool magazine of the assembly shown in FIG. 1 and is taken along line 5—5 of FIG. 1.

Referring now to FIG. 1 in greater detail, there is illustrated in FIG. 1 a tool assembly 10 comprising an elongate spindle 12 including a body 13 having a socket 14 at an outer end 16 thereof for receiving a tool 18, as shown.

Mounted on the spindle 12 is a tool magazine 20 comprising a cylindrical body 22 with a throughbore 24 and three holes or bores 31, 32 and 33 extending into a back face 34 of the generally cylindrical body 22 for receiving and storing three tools, two of which 36 and 38 are shown in FIG. 1. The tools 36 and 38 are held in the holes 31, 32 or 33 by friction, by a magnet or by a spring (see magnet 76 in FIG. 1 and spring 78 in FIGS. 3 and 4).

Then, mounted adjacent the outer end 16 of the spindle 12 is a conduit reamer 40 which is of conventional construction and which includes a cylindrical body 42 having three stepped cylindrical portions 51, 52 and 53 and a throughbore 56. A hook-shaped member 61, 62 or 63 is integral with each one of the stepped cylindrical portions 51, 52 and 53, respectively. Each hook-shaped member 61, 62 and 63 extends radially outwardly therefrom to a flange or finger 71, 72 or 73 formed in the member and extending axially forwardly, generally parallel to an elongate axis of the spindle 12 and of the cylindrical body 42.

Figure 2:
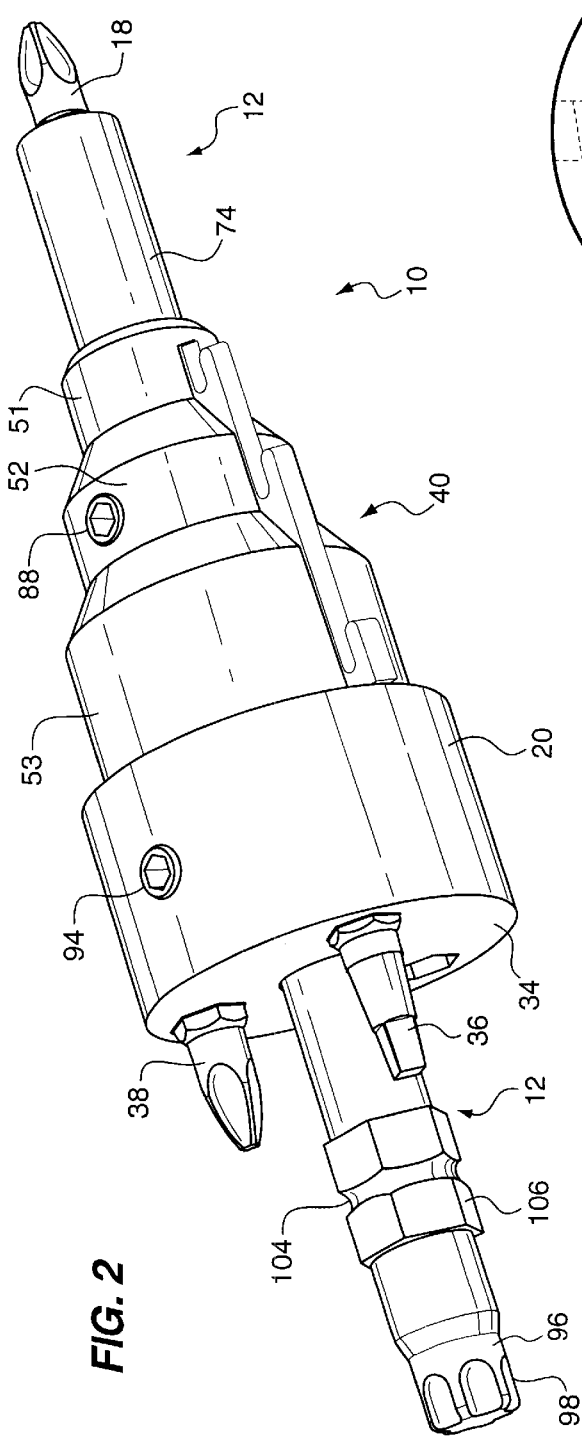
FIG. 2 is a perspective view of the tool assembly with the parts assembled on a modified spindle having a hexagonal structure thereon with an annular groove in the hexagonal structure.

Referring now to FIGS. 1 and 2, it will be seen that an outer distal end portion 74 of the spindle 12 has a somewhat larger diameter than the body 13 of the spindle 12 so that the conduit reamer 40 can only slide on the body 13 up to the outer end portion 74 and not beyond it.

In the embodiment illustrated in FIG. 1, a magnet 76 is fixed at the bottom of the socket 14 for releasably holding a magnetizable metal tool 18. It is to be understood that this is just one form of structure for holding the tool 18 in the socket 14. Other structures, such as a spring 78 illustrated in FIGS. 3 and 4, can be used.

Figure 3:
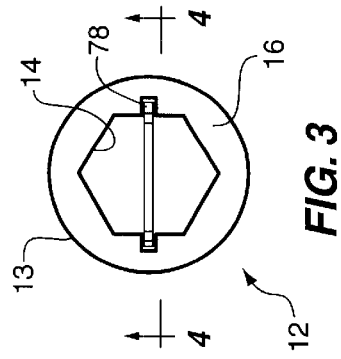
FIG. 3 is an end view of one form of the spindle distal end which would be taken along line 3—3 of FIG. 1.

In FIG. 3 is illustrated the outer end 16 of the spindle 12 and the socket 14. As shown, the opposite walls of the socket 14 have slots therein for receiving the wire spring 78 for releasably holding a shank of a tool, e.g. tool 18, in the socket 14.

As a further alternative, a shank of the tool 18 can have an annular groove or socket for snap-fittingly receiving a ball which is spring mounted in a wall of the socket 14.

The body 13 of the spindle 12 further has opposed flats 82 and 84 which are adapted to be aligned with a threaded bore 86 in the second stepped cylindrical portion 52 of the conduit reamer 40. The threaded bore 86 receives an Allen screw 88 shown in FIG. 1 for engaging a flat 82 or 84, and it will be understood that a similar threaded bore and Allen screw are provided on the opposite side of the conduit reamer 40 whereby the Allen screws on opposite sides can engage each one of the flats 82, 84, respectively.

Then, further down the body 13 of the spindle 12 is another flat 90 which is adapted to be aligned with a threaded bore 92 in the cylindrical body 22 of the tool magazine 20 and which receives an Allen screw 94 which can be screw threadedly moved against the flat 90 for holding the tool magazine 20 on the spindle 12.

In the embodiment of the spindle 12 shown in FIG. 1, an annular groove 94 is formed in the body 13 of the spindle 12 at or adjacent an inner end 96 of the spindle 12. The inner end 96 of the spindle 12 has a spline formation or configuration 98 for mating with a mating spline formation or configuration 98 in the bottom of a conventional chuck assembly where the spline formation is used for receiving a mounting tool for mounting the chuck on a threaded outer end of a motor shaft, as is known in the art from the Sapalka U.S. Pat. No. 5,193,824. The end 96 can also be a hexagonal or rectangular shape as described in the Sapalka patent.

As shown in FIGS. 1 and 2, the members 61, 62 and 63 are formed with a generally U-shaped space between the member 61, 62 and 63 and the radially outwardly disposed flange or finger 71,72 or 73. The flange or finger 71 is positioned adjacent the smallest cylindrical portion 61, the second flange 72 is positioned adjacent the immediate cylindrical portion 62 and the flange 73 is positioned adjacent the outermost cylindrical portion 63 of the conduit reamer 40.

It will be understood, as is known in the art, that the conduit reamer 40 is inserted inside a cut end of a conduit, e.g. ½ inch, ¾ inch or 1 inch conduit, and then rotated, in this case by a rotatable drive, such as a power drill chuck, to remove burrs on the inner and outer edges of the cut end of the conduit. The conduit reamer 40 which is of conventional construction is constructed, designed and arranged to ream the ends of three different sizes of conduits, the most common being ½ inch conduit, ¾ inch conduit and 1 inch conduit.

While the conduit reamer 40 is primarily intended for use by electricians, it can be used by other tradesmen who are working with conduit and cutting it into sections.

Figure 4:
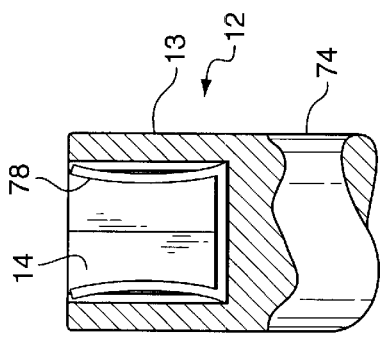
FIG. 4 is a sectional view through the spindle distal end shown in FIG. 3 and is taken along line 4—4 of FIG. 3.

In FIGS. 3 and 4 is shown the slot formed in the wall 14 in the outer end 16 of the spindle 12. Received in the slot is the U-shaped spring 78, as shown in FIGS. 3 and 4, which has a slight bow to it so that it can be pressed in the slot in the wall of the socket 14 when the tool 18 is inserted into the socket 14 and the spring pressure of the spring 78 against the shank of the tool 18 holds the tool 18 in the socket 14 against axial movement.

The spindle 12 shown in FIG. 2 is modified from the spindle 12 shown in FIG. 1 by having a polygonal, more specifically hexagonal, structure 106 formed on the spindle 12 adjacent or near the inner end 96 of the spindle 12. When this hexagonal structure 106 is provided on the spline 12, the spline configuration can be eliminated or the hexagonal portion can be used in addition to the spline configuration 98 at the inner end 96 of the spindle 12 thereby to provide a stronger drive from a specially configured chuck assembly having mating configurations for mating with the spline configuration 98 and with the hexagonal structure 106.

Also, as shown in FIG. 1, to prevent axial movement of the spindle 12, the annular groove 94 is formed in the body of the spindle 12. In like manner, an annular groove 104 is provided in the hexagonal structure 106 and a spring biased detent in a specially configured chuck assembly is adapted to mate with the annular groove, as disclosed in applicant's prior application Ser. No. 09/317,231 filed on May 24, 1999, now U.S. Pat. No. 6,135,462.

The tool magazine 20 shown in FIGS. 1, 2 and 5 comprises the cylindrical body 22 and the three tool holding holes 31, 32 and 33 extending into the backwardly facing surface 34 of the body 22. Three holes 31 32 and 33 can have a generally hexagonal configuration for receiving a tool having a hexagonal shank, such as the tools 36 and 38 shown in FIGS. 1 and 2. Such tools 18, 36 and 38 can be held in the holes, bores or sockets 31, 32 or 33 by friction or can be held by a spring, magnet or a ball detent. The cylindrical body 22 of the tool magazine 20 has the central throughbore 24 to enable the tool magazine 20 to be slid over the body 13 of the spindle 12 and then locked in place by the Allen screw 94 which is threaded against the flat 90. From the foregoing description, it will be appreciated that the conduit reamer tool assembly 10 of the present invention provides not only a conduit reamer 40 but also a spindle 12 which enables the conduit reamer 40 to be rotated by a power drill and which has a tool socket 14 at an outer end 16 thereof for receiving a tool having a hexagonal stem or base structure for enabling the tool to be snap-fittingly received in the socket 14 in the outer end 16 of the spindle 12. Then, the tool magazine 20 allows other tools, such as a straight screw driver drill bit tool, a square drive drill bit tool, a Phillips head driver tool or an Allen head screw driver tool, to be carried in the tool magazine 20 and easily pulled out of the tool magazine for insertion into the drive socket 14 at the outer end 16 of the spindle 12.

Additionally, it will be understood that the various tool assembly constructions disclosed herein can be provided with additional hexagonal structure near the inner end 96 of the spindle 12 for enabling a driving structure or a special chuck assembly to drive the conduit reamer tool assembly 10 without closing the jaws of the chuck as is required in a conventional chuck.

The spindle 12 with a spline formation 98 at the inner end 16 is required for the assembly shown in FIG. 1 and the annular groove 94 is optional, since, when spring biased detents in the chuck assembly engage with the spindle 12 some, minimal restraint against axial movement of the spindle 12 is provided. However, to provide a stronger force against axial movement of the conduit reamer tool assembly, an annular groove 94 or 104 is provided for receiving one or more spring biased detents in a special chuck assembly, such as the special chuck assembly disclosed in applicant's earlier U.S. Pat. No. 6,135,462.

To provide a stronger drive, as an alternative or addition to the spline formation 98, at the inner end 96 of the spindle 12, the hexagonal drive formation 106 can be provided on the spindle 12 as shown in FIG. 2. Here again, to provide a strong force against axial movement of the spindle, an annular groove 104 can be formed in the hexagonal structure 106. It is to be noted, however, that the annular groove 104 can be provided outside of hexagonal drive formation 106 depending upon the location of spring biased detents in the special chuck assembly.

Also, the spindle 12 can have a body which has a hexagonal cross-section for most of its length, except for the outer end, which has a larger cross-section, so that the conduit reamer 40 will not slip off the spindle 12. In this embodiment, throughbore 24 and 56 would have a matting hexagonal cross-section. Additionally, the Allen screws 88 and 94 could be omitted by providing a n annular groove in the body of the spindle 10 adjacent the base or back surface 34 of the tool magazine 20 in which a split or C-ring is inserted. Alternatively, a longitudinally extending spline or groove can be provided on or in the outer surface of the body 13 of the spindle 12 and a mating groove or spline would be provided in the throughbores 24 and 56 to prevent relative rotational movement between the spindle 12 and the tool magazine 20 or the conduit reamer 40, which are held against axial movement by an Allen screw or a C-ring.

Another modification would be to provide a "quick change" mechanism at the outer end 16 of the spindle 12. Such a "quick change" mechanism could be of the type disclosed in the Wienhold U.S. Pat. No. 4,900,202 or U.S. Pat. No. 5,417,527, the Salpaka U.S. Pat. No. 5,464,229, the Jore U.S. Pat. No. 5,954,463, or the Watzke U.S. Pat. No. 5,967,713.

Still further, the holes, bores or sockets 31, 32 or 33 in the tool magazine 20 could be formed in the back face of the body 42 of the conduit reamer 40, thereby incorporating the tool magazine into the conduit reamer 40 resulting in a shorter conduit reamer/tool magazine assembly.

From the foregoing description, it will be appreciated that the conduit reamer tool assembly 10 of the present invention has a number of advantages, some of which have been described above, and others of which are inherent in the invention. In particular, the conduit reamer tool assembly 10 provides a conduit reamer 40 which can be rotated by a power tool to enable an electrician to quickly ream out the outer end of a freshly cut piece of conduit. Then, the drive socket 14 in the outer end 16 of the spindle 12 can be used for mounting a tool, such as a straight head, Phillips head or Allen head screw driver tool, or even a drill bit. Next, the tool magazine 10 enables the user of the conduit reamer tool assembly 10 to carry additional tool heads for insertion into the drive socket 14. Finally, the spline formation 98 and the annular groove 94 or 104 and the hexagonal drive structure 100 provide various structures on a spindle 12 for rotatably driving the conduit reamer tool assembly and for limiting axial movement of the spindle 12. Accordingly, the scope of the invention is only to be limited as necessitated by the accompanying claims.

I claim:

1. A conduit reamer assembly comprising:
   a spindle having a main body portion, a distal end and a proximal end;
   drive structure on said spindle for mating with corresponding drive structure in a rotatable drive structure in or on which said conduit reamer assembly is mounted;
   a conduit reamer mounted on said spindle and comprising at least two stepped cylindrical sections including a first cylindrical section and a second larger diameter section;
   a first generally hook-shape formation extending radially outwardly from said first cylindrical section and defining a U-shaped space between said cylindrical section and an outer axially finger of said first formation;
   said second cylindrical section having a second generally hook-shape formation extending generally radially outwardly from said second cylindrical section and defining a U-shaped space between said second cylindrical section and an outer axially extending finger of said second formation; and
   said conduit reamer having means for fixing said reamer against rotation on said spindle and said U-shaped spaces being adapted to be received over a cut end of a piece of conduit for engaging the cut end as said conduit reamer is rotated.

2. The conduit reamer assembly of claim 1 wherein said spindle has a slightly larger diameter distal end portion and said body of said conduit reamer has a throughbore therethrough arranged to be received over said main body portion of said spindle for movement up to said larger diameter distal portion.

3. The conduit reamer assembly of claim 1 wherein said conduit reamer assembly includes at least one flat on said main body portion of said spindle and said body of said reamer has at least one radially extending bore therethrough which is threaded and which receives an Allen screw for fixing said cylindrical body to said main body portion of said spindle, said flat and said screw defining said means for fixing said reamer against rotation on said spindle.

4. The conduit reamer assembly of claim 1 wherein said distal end of said spindle has a socket therein sized to receive a polygonal shaft or base of a tool for driving the tool and said socket having means therein for releasably holding said tool in said socket.

5. The conduit reamer assembly of claim 4 wherein said holding means includes a magnet.

6. The conduit reamer assembly of claim 4 wherein said holding means includes a spring.

7. The conduit reamer assembly of claim 1 further including a tool magazine including a body having a throughbore which is received over said spindle and behind said conduit reamer, said body having a rearwardly facing surface and said tool magazine including at least one bore, socket or hole extending into said tool magazine from said back surface thereof for receiving and storing a tool.

8. The conduit reamer assembly of claim 7 wherein said tool magazine has at least two bores, holes or sockets each having a polygonal cross-section for receiving a polygonally configured base of a tool.

9. The conduit reamer assembly of claim 7 including means for holding the tool in said socket, hole or bore selected from a friction fit, a magnet or a spring.

10. The conduit reamer assembly of claim 1 wherein said proximal end of said spindle has a spline formation thereon for engaging with a mating spline formation within a rotatable drive structure.

11. The conduit reamer assembly of claim 1 wherein said spindle has an annular groove therein for mating with a spring biased detent in a rotatable drive structure for providing an axial holding force to hold said spindle against axial movement relative to the rotatable drive structure.

12. The conduit reamer assembly of claim 1 wherein said drive structure comprises a polygonal formation on the exterior of said main body of said spindle.

13. A tool mounting and tool magazine assembly comprising:
   a spindle having a main body portion, a distal end and a proximal end;
   drive structure on said spindle for mating with corresponding drive structure in a rotatable drive structure in or on a driving mechanism;
   a conduit reamer assembly mounted on said spindle;
   a tool magazine including a body having a throughbore which is received over said spindle for mounting said tool magazine behind said conduit reamer, said body having a rearwardly facing surface and said tool magazine including at least one bore, socket or hole extending into said tool magazine from said back surface thereof for receiving and storing a tool.

14. The tool holder and tool magazine assembly of claim 13 wherein said tool magazine has at least two bores, holes or sockets each having a polygonal cross-section for receiving a polygonally configured base of a tool.

15. The tool holder and tool magazine assembly of claim 13 including means for holding the tool in said socket, hole or bore selected from a friction fit, a magnet or a spring.

16. The tool holder and tool magazine assembly of claim 13 wherein said proximal end of said spindle has a spline formation thereon for engaging with a mating spline formation within a rotatable drive structure.

17. The tool holder and tool magazine assembly of claim 13 wherein said spindle has an annular groove therein for mating with a spring biased detent in a rotatable drive structure for providing an axial holding force to hold said spindle against axial movement relative to the rotatable drive structure.

18. The tool holder and tool magazine assembly of claim 13 wherein said drive structure comprises a polygonal formation on the exterior of said main body of said spindle.

19. The tool holder and tool magazine assembly of claim 13 wherein said conduit reamer is mounted on said spindle ahead of said tool magazine and comprises at least two stepped cylindrical sections including a first cylindrical section and a second larger diameter section; a first, generally hook-shape formation extending radially outwardly of said first cylindrical section and defining a U-shaped space between said cylindrical section and an outer axially extending finger of said first formation; said second cylindrical section having a second hook shaped formation extending generally radially outwardly from said second cylindrical section and defining a U-shaped space between said second cylindrical section and an outer axially extending finger of said second formation; and said conduit reamer having means for fixing said reamer against rotation on said spindle and said U-shaped spaces being adapted to be received over a cut end of a piece of conduit for engaging the cut end as said conduit reamer is rotated.

* * * * *